United States Patent [19]
Lefebvre

[11] Patent Number: 5,458,820
[45] Date of Patent: Oct. 17, 1995

[54] METHOD OF MAKING A THERMOPLASTIC LENS COATED WITH A THERMOSETTING PROTECTIVE LAYER

[75] Inventor: Gilles Lefebvre, Joinville Le Pont, France

[73] Assignee: Essilor International Cie Generale D'Optique, Charenton Le Pont, France

[21] Appl. No.: 199,171

[22] PCT Filed: Sep. 17, 1992

[86] PCT No.: PCT/FR92/00871

§ 371 Date: Feb. 25, 1994

§ 102(e) Date: Feb. 25, 1994

[87] PCT Pub. No.: WO93/05951

PCT Pub. Date: Apr. 1, 1993

[30] Foreign Application Priority Data

Sep. 23, 1991 [FR] France ............... 91 11676

[51] Int. Cl.⁶ ................................ B29D 11/00
[52] U.S. Cl. ............... 264/1.7; 264/2.7; 425/808; 427/164
[58] Field of Search .............. 264/1.7, 1.8, 255, 264/2.7; 425/808; 427/164

[56] References Cited

U.S. PATENT DOCUMENTS

| | | | |
|---|---|---|---|
| 2,479,935 | 8/1949 | Johnson | 264/1.7 |
| 3,248,460 | 4/1966 | Naujokas | 264/1.7 |
| 3,322,598 | 5/1967 | Marks et al. | |
| 3,465,076 | 9/1969 | Asami et al. | 264/1.7 |
| 3,953,115 | 4/1976 | French et al. | |
| 3,971,872 | 7/1976 | LeBouef | |
| 4,127,697 | 11/1978 | Laurin | |
| 4,544,572 | 10/1985 | Sandvig et al. | |
| 4,774,035 | 9/1988 | Carmelite et al. | 264/1.7 |
| 5,049,321 | 9/1991 | Galic | 264/1.7 |
| 5,100,590 | 3/1992 | Ruhlin | 425/808 |

FOREIGN PATENT DOCUMENTS

| | | |
|---|---|---|
| 0019947 | 12/1980 | European Pat. Off. |
| 0366545 | 5/1990 | European Pat. Off. |
| 2358256 | 2/1978 | France |
| 1172417 | 6/1964 | Germany |

*Primary Examiner*—Mathieu D. Vargot
*Attorney, Agent, or Firm*—Young & Thompson

[57] ABSTRACT

A method for making a thermoplastic optical lens having at least one side coated with a thermosetting protective film is provided. The method includes steps of applying a thermosetting coating composition to a molding surface of the molding shell, disposing the thermoplastic lens blank in a horizontal position and vertically above the molding shell, heating the lens blank to cause thermal sagging under low static load conditions as the lens blank comes into contact with the coating composition on the molding surface and continuing heating until the lens blank mates with the molding surface.

12 Claims, 1 Drawing Sheet

METHOD OF MAKING A THERMOPLASTIC LENS COATED WITH A THERMOSETTING PROTECTIVE LAYER

FIELD OF THE INVENTION

The present invention is generally concerned with optical lenses, and in particular ophthalmic lenses, made from a thermoplastics synthetic material such as polycarbonate, for example.

It is more particularly directed to the situation in which, as in the method which is the subject matter of French patent application number 88 14046 filed 27 Oct. 1988 (published number 2 638 391), a lens of this kind is formed from a lens blank which is heated so that natural thermal sagging under a reduced static load causes it to mate with the shape of an underlying molding shell.

BACKGROUND OF THE INVENTION

An advantage of a shaping process of this kind is that it can produce directly the final geometry of the required optical lens so that the latter is directly usable by the optician.

Another and more important advantage is that it produces only weak and even tension stresses within the optical lens.

In practise these internal tension stresses are only in the order of one tenth of those in an optical lens made in the conventional manner by injection molding.

However, regardless of the process by which they are shaped, thermoplastics synthetic material optical lenses have a further disadvantage in their mediocre resistance to abrasion.

It has therefore been proposed to coat at least one side of such lenses with a thermosetting synthetic material protection film which has good resistance to abrasion.

Various coating methods have been proposed, the diversity of which bears witness to the difficulty of this problem.

The most usual method is first to shape the optical lens to its final geometry, whether by injection molding or by natural thermal sagging, and then to apply the necessary thermosetting synthetic material coating composition or varnish to the optical lens, and finally to harden, i.e. polymerize the coating composition by heating or by radiation.

Apart from the fact that the thickness of the resulting film is not always easy to control, a drawback of this coating method is that by its very nature it introduces an additional stage of manufacture, necessarily being carried out at a different stage from that in which the optical lens itself is made.

To combine these two stages into one attempts have been made to form the optical lens to its final geometry when already coated with its protective film, the latter being at least partially hardened beforehand.

This is the case, for example, in French patent application number 77 20742 filed 6 Jul. 1977 (published number 2 358 256) and in U.S. Pat. Nos. 2,322,310, 2,481,809 and 2,640, 227.

All these methods conventionally require the application of high pressures (in the order of 7 kg/cm$^2$ to 300 kg/cm$^2$) in a press and in an uncontrolled manner and therefore result in non-negligible internal tension stresses in the optical lens finally obtained.

When the protection film applied to the optical lens is totally polymerized before final shaping of the lens, the shaping almost inevitably causes cracking of the protection film because of the stresses occurring at the interface between it and the substrate it covers.

If the protection film is only partially polymerized before final shaping of the optical lens it is difficult to control its thickness at the end of the shaping process.

Finally, if the pressure that has to be used to shape the optical lens to its final shape is particularly high, it necessitates softening of the substrate beforehand, which is undesirable.

OBJECT AND SUMMARY OF THE INVENTION

A general object of the present invention is a method for obtaining in a single stage but without the above drawbacks a thermoplastics synthetic material optical lens coated on at least one side with a thermosetting synthetic material protection film.

It is based on the observation, not previously made, that if in the shaping process by natural thermal sagging a mold release agent is used on the molding shell, the mold release agent is transferred from the molding shell to the optical lens, adhering thereto and, surprisingly, that the same applies to any other coating composition if the latter is not fully polymerized.

Based on this observation, the method according to the invention is generally characterized in that starting from a thermoplastics synthetic material lens blank and a molding shell to the molding surface of which of a thermosetting synthetic material coating composition has been applied, said lens blank is disposed horizontally, vertically above said molding shell and heated to cause natural thermal sagging under a reduced static load of the lens blank until by contact with the coating composition on the molding surface of the molding shell it mates with the shape of said molding surface.

At the end of this process the coating composition, used on its own or together with a mold release agent, is entirely transferred from the molding shell to the lens blank, which is shaped to its final shape, the coating adhering to the lens in the required manner.

Thus in a single stage there is easily obtained an optical lens made from a thermoplastics synthetic material by natural thermal sagging having only weak and even internal stresses or no internal stresses at all and directly usable by an optician because it is directly shaped to its final shape and is coated on at least one side with the thermosetting synthetic material protection film having all the necessary abrasion resistance and adhering perfectly to the substrate it covers.

The technique usually called "in mold coating" (IMC) is a known method of coating an article within the mold in which it is made.

However, until now this technique has been used only for thermosetting synthetic material substrates of the same kind as the coating composition applied to them and the latter is introduced into the mold in the liquid state.

The combination is reactive, interaction inevitably occurring between the substrate during polymerization and the liquid coating composition with which it is in contact. The end result is some homogenization of this combination, to the detriment of the inherent qualities of the coating composition and therefore those of the protection film it produces.

This is absolutely not the case in the method according to the invention which, to the contrary, is intended to produce and succeeds in producing a heterogeneous product with a clear distinction but nevertheless all the required adherence at the interface between a thermoplastics synthetic material substrate and a thermosetting synthetic material protection film retaining intrinsically all its hardening quality.

It has to be emphasized that this result is entirely surprising.

The treated lens blank comes into contact progressively with the coating composition as it sags when heated at the same time as the coating composition is polymerized, there having previously been nothing to suggest that, despite the changing nature of the coating composition, when its application to the lens blank itself being shaped is completed a perfectly satisfactory protection film could be obtained.

To the contrary, it has been necessary to overcome some prejudice which holds that it is not normally possible to obtain a satisfactory product reproducibly if the nature of the constituents of the product changes during its formation.

This is the case in the method according to the invention, however.

The invention also reconciles in a satisfactory manner two normally contradictory requirements, yielding good adherence between two constituents of different kinds while minimizing the risk of tension stresses at the interface between them.

BRIEF DESCRIPTION OF THE DRAWINGS

The features and advantages of the invention emerge from the following description given by way of example with reference to the appended diagrammatic drawings in which.

DETAILED DESCRIPTION OF THE INVENTION

Referring to the figures, the overall aim is to obtain an optical lens 10 which, forming a thermoplastics synthetic material (for example polycarbonate) substrate, is coated on at least one side with a thermosetting synthetic material protection film 11.

Figure 1:
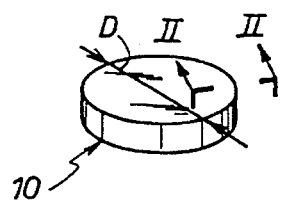
FIG. 1 is a perspective view of an optical lens which can be formed by the method according to the invention.
Figure 2:
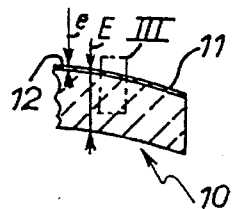
FIG. 2 is a partial view of the lens to a larger scale and in axial cross-section on the line II—II in FIG. 1.
Figure 3:
FIG. 3 shows to a still larger scale part of FIG. 2 marked by a frame III in FIG. 2.

In the embodiment shown in FIGS. 1 to 3 the optical lens 10 is a concave-convex ophthalmic lens and before it is trimmed to size, as shown, it has a circular contour with a flat edge of diameter D and average thickness E.

In this embodiment only its convex side 12 is coated with a protection film 11.

The thickness of the protection film 11 is e.

This thickness e is only a fraction of the thickness E, being in practise less than one thousandth of the latter.

The optical lens 10 is made by the natural thermal sagging method as described in French patent no 2 638 391.

The content of this French patent is hereby incorporated by way of reference.

Figure 4:
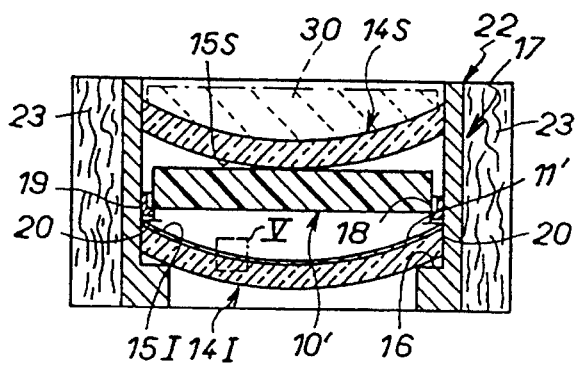
FIG. 4 is an axial cross-section view to a different scale showing the implementation of the method according to the invention prior to shaping of the original lens blank.
Figure 5:
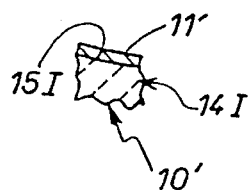
FIG. 5 shows to a larger scale the part of FIG. 4 shown by a frame V in FIG. 4.

Briefly, referring to FIG. 4, starting from a thermoplastics synthetic material (for example polycarbonate) lens blank 10' and a molding shell 14I having a molding surface 15I whose geometry corresponds to that required for the corresponding side of the lens to be formed, the lens blank 10' is disposed horizontally, vertically above the molding shell 14I with the molding surface 15I of the molding shell 14I facing upwards, and heated to cause natural thermal sagging under a reduced static load of the lens blank 10' until it mates with the shape of the molding surface 15I.

In the embodiment shown, and in the method described in detail in French patent no 2 638 391, the molding shell 14I rests on a shoulder 16 projecting from a lower part of the inside surface of a ring 17, the lens blank 10' itself resting on a shoulder 18 projecting from the inside surface of a ring 19 which bears on the molding shell 14I and which has at its base vents 20. A molding shell 14S is mounted to slide freely in the ring 17 above the lens blank 10', bearing on the latter, its downwardly facing molding surface 15S having the required geometry of the respective side of the lens 10 to be shaped.

The ring 17 defines with the molding shells 14I, 14S a mold 22 which in the embodiment shown is thermally insulated on the outside and over all of its height by an insulative thermal jacket 23.

As an alternative to this the ring 17 and the insulative thermal jacket 23 can be in one piece.

Figure 7:
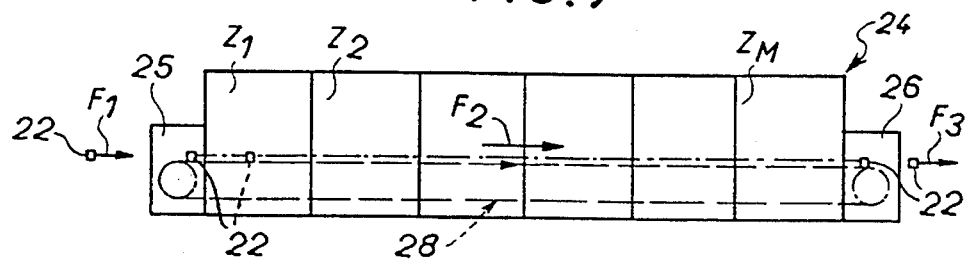
FIG. 7 is a diagrammatic elevation view to a different scale of an oven used for the shaping method.

To bring about the required thermal sagging the mold 22 and the lens blank 10' therein are inserted in the direction of the arrow F1 in FIG. 7 into a tunnel oven 24 which has, in addition to a loading area 25 at its inlet end and an offloading area 26 at its outlet end, a plurality of successive separate areas Z1, Z2, . . . ZN with their temperature individually controlled and a conveyor 28 running along its entire length for transferring the mold 22 from its entry end to its exit end in the direction of the arrow F2 in FIG. 7.

As an alternative to this the tunnel oven 24 can have only one heating area, the temperature in which is varied during the thermal sagging process.

After passing through the tunnel oven 24 the mold 22 is removed therefrom in the direction of the arrow F3 in FIG. 7.

In the embodiment shown the lens blank 10' is flat.

The side of the optical lens 10 to be shaped which is to be coated with a protection film 11 being its convex side 12, the molding surface 15I of the bottom molding shell 14I is concave and the molding surface 15S of the top molding shell 14S is convex.

According to the invention, and prior to the natural thermal sagging process, a thermosetting synthetic material coating composition 11' is applied to the molding surface 15I of the molding shell 14I in the form of a film covering all of this molding surface 15I.

The lens blank 10' therefore comes into contact with this coating composition 11' when, as a result of natural thermal sagging, it mates with the shape of the molding surface 15I of the molding shell 14I disposed beneath it.

Figure 6A:
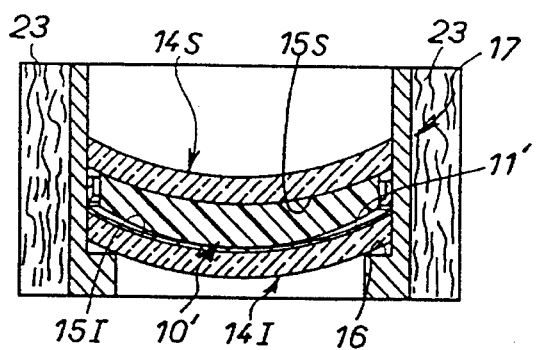
FIGS. 6A, 6B are axial cross-section views analogous to those in FIG. 4 for two successive phases in shaping of the optical lens.
Figure 6B:
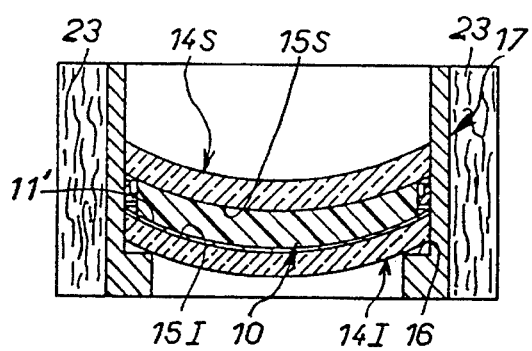

At the end of the natural thermal sagging process, and as shown in FIG. 6B, the coating composition 11' is transferred from the molding shell 14I to the lens blank 10', the coating composition 11' then forming on the optical lens 10 obtained the required protection film 11, adhering as required to its convex side 12.

On first contact of the lens blank 10' with the coating composition 11', the latter has preferably reached a temperature in excess of its gel point in order to limit if not eliminate any lateral flow thereof.

In other words, the coating composition 11' is preferably no longer liquid at this time.

To this end, and as described in more detail below, it is first dried or prepolymerized.

In any event, it preferably has added to it a catalyst adapted to render polymerization progressive and so favor its adherence to the lens blank 10'.

As shown diagrammatically in FIG. 6A first contact of the lens blank 10' with the coating composition 11' is preferably in the central area of the molding shell 14I.

This prevents any air pocket being trapped between the molding shell 14I and the lens blank 10' during its natural thermal sagging.

One function of the ring 19 is to achieve this result.

As it passes through the tunnel oven 24 inside the mold 22 the lens blank 10' is heated to a temperature T between its vitreous transition temperature $T_g$ and its melting point $T_f$, without reaching the latter.

The coating composition 11' used must naturally be chosen accordingly.

In other words, it must be able to withstand the temperature T without deteriorating.

It must also be chosen such that its shrinkage between this temperature T and room temperature is comparable with that of the thermoplastics synthetic material of the lens blank 10'.

This is so that the protection film 11 that it forms on the surface of the resulting optical lens 10 is not detached from the latter on cooling.

To the contrary, it seems that although there is a clear interface between the protection film 11 and the substrate that it covers, there is excellent adherence between it and the latter, passing the usual adherence tests, and considered to be the result of a physical-chemical process.

Release of the optical lens 10 from the mold is also good, its protection film 11 not adhering to the molding shell 14I.

The static load to which the lens blank 10' is subjected during its natural thermal sagging process is preferably restricted to a value below 10 kg.

This static load is preferably restricted to a value between 2.5 kg and 50 g.

As shown, this static load in practise is the result of gravity alone.

It is restricted to the weight of the top molding shell 14S, which can have an additional weight 30 placed on the top, as shown diagrammatically in dashed outline in FIG. 4.

The method according to the invention can be implemented as follows.

First the bottom molding shell 14I is varnished, i.e. the coating composition 11' used is applied to its molding surface 15I.

This varnish can be applied in the usual way by dipping into a bath or by centrifuging.

These techniques are well known in themselves and need not be described in more detail here.

Depending on the configuration of the lens blank 10', the varnished molding shell 14I is:
1) either used directly without preliminary treatment,
2) or, especially if the lens blank 10 is precurved:
   a) allowed to remain at room temperature for sufficient time for the coating composition 11' on it to be dust-dry, or
   b) heated to a temperature above the gel point of the coating composition 11'.

The dried or preheated bottom molding shell 14I is then placed in the ring 17 followed by the ring 19, the lens blank 10' and the top molding shell 14S, with the additional weight 30 if required.

If the lens blank 10' is flat it is at a distance from the molding shell 14I.

If it is precurved it bears against the latter.

Either way, the mold 22 is then placed in the tunnel oven 24.

As it passes through the latter the temperature is increased to polymerize further the coating composition 1' on the bottom molding shell 14I and to initiate thermal sagging of the lens blank 10'.

If the lens blank 10' is flat, as shown here, it therefore comes into contact with the coating composition 11' in the central area of the molding shell 14I, after about 30 minutes (FIG. 6A).

As the temperature of the coating composition 11' is above its gel point, as mentioned above, there is no significant flow of the coating composition 11' towards the edge of the molding shell 14I.

As thermal sagging of the lens blank 10' continues, the lens blank 10' progressively mates with the shape of the molding surface 15I of the molding shell 14I (FIG. 6B) and at the same time polymerization of the protection composition 11' on the latter continues.

To illustrate the invention more clearly there follows an example of its use for a flat lens blank 10' having a diameter D in the order of 80 mm.

I. Preparation of coating composition 11'

The thermosetting coating composition is preferably a polysiloxane type varnish.

361.08 g of glycidoxypropyltrimethoxysilane having formula $RSi(OR')_3$ (where R=glycidoxypropyl and R'=CH$_3$) was hydrolized in 82.89 g of 0.1N hydrochloric acid.

Hydrolysis continued for 24 hours.

To increase abrasion resistance, 94.55 g of a solution of colloidal silica in methanol was added to the hydrolysate obtained, the colloidal silica content of the solution being 30% and the silica particle diameter being 13 mµm (millimicrons).

1.19 g of aluminium acetylacetonate were then added as catalyst and 66.03 g of ethylcellosolve and 171.55 g of methanol were added as solvent.

0.6 g of FC430 were then added as surfactant.

After complete polymerization the colloidal silica content of the dry extract was in the order of 10% and the $RSiO_{3/2}$ content was in the order of 90%.

II. Treatment of molding shells 14I, 14S

The molding shells 14I, 14S, the molding surfaces 15I, 15S of which can have any geometry, for example progressive toroidal or cylindrical geometry, can be of mineral glass subjected to thermal annealing, for example.

Their molding surfaces 15I, 15S were coated with a mold release agent such as dimethyldichlorosilane either by vapor deposition or by application of a mixture in isopropyl alcohol containing 2% by weight of this mold release agent.

Alternatively, the molding shells 14I, 14S can be used as they are.

In this case, however, their molding surfaces 15I, 15S are preferably wiped with acetone to degrease them and render them chemically clean.

III. Application of coating composition 11' to molding shell 14I

This application is done by immersion in a bath, for example.

The bath was held at a temperature of 3° C. to 4° C., the molding shell 14I introduced into it vertically, held in it for 1 minute 25 seconds and removed from it with a dewetting time (i.e. a raising time) of one minute.

Alternatively, however, and as previously mentioned, the coating composition 11' can be applied to the molding shell 14I by centrifuging.

In either case, if the starting lens blank 10' is flat, as here, the molding shell 14I entirely coated, and therefore having a molding surface 15I coated, with a film of coating composition 11', was dried at room temperature until it was dust-dry, i.e. until it had polymerized so that it was no longer tacky.

IV. Heat treatment

The static load applied to the lens blank 10' in the mold 22 into which it had been placed was limited to the weight of the molding shell 14S on top of it, which was 100 g.

The mold 22 was placed directly in the tunnel oven 24, the initial temperature in which was 110° C.

There it underwent the following cycle:

temperature increased from 110° C. to 160° C. in 30 minutes, temperature maintained at 160° C. for 30 minutes, temperature increased from 160° C. to 196° C. in 35 minutes, temperature maintained at 196° C. for 50 minutes, temperature increased from 196° C. to 203° C. in ten minutes, temperature reduced from 203° C. to 30° C. in two hours.

V. Characteristics of resulting protection film 11

Thickness: 2.56 μm.

Adherence tests:

A first adherence test was carried out according to French standard AFNOR 76 FNT 30-038, in which results are classified as degree 0 through degree 5.

It entails cutting the protection film 11 into a cross-hatched mesh of incised lines, applying adhesive tape to the cross-hatched protection layer 11 and attempting to pull it off using the tape.

Result: degree 0.

The edges of the cuts remained perfectly smooth and none of the squares thereby was detached.

As a control, a second adherence test of the same type was carried out on an optical lens 10 provided with a protection film 11 and previously immersed in boiling water for 30 minutes.

The results were the same.

Abrasion resistance tests:

BAYER test:

This yielded a value of 3 to 4, substantially the same as that of protection layers 11 obtained by a prior art method.

Steel wool test:

This also yielded a result comparable to that for protection films 11 obtained in the usual way.

Of course, the present invention is not limited to the embodiment specifically described, but encompasses any variant execution thereof.

In particular, the silica content of the colloidal silica suspension used in the coating composition for favoring its abrasion resistance, given as a percentage dry extract relative to the final product, can vary between 0% and 30%, preferably between 10% and 30%.

It is most preferably below 30%, however.

Above 30% cracking of the protection layer can occur, shrinkage of this layer being then too great.

Similarly, the quantity of catalyst used in the composition to render polymerization progressive can be varied.

However, it is usually between 0% and 0.5% by weight, representing a compromise between good abrasion resistance and good adherence.

At 0% adherence is satisfactory but abrasion resistance can be mediocre and beyond 0.5% polymerization is usually too fast for adherence to be satisfactory.

Between 0% and 0.3% by weight of the catalyst is preferably used in the coating composition.

Applications of the invention are naturally not restricted to the treatment of concave-convex ophthalmic lenses, but extend more generally to the treatment of any optical lens, regardless of its profile.

Finally, it goes without saying that both sides of an optical lens can be coated in this way with a protection film.

I claim:

1. Method for making a thermoplastic optical lens having at least one side coated with a thermosetting protective film comprising the steps of: providing a polymerized and hardened thermoplastic lens blank and a molding shell, applying a thermosetting coating composition to a molding surface of the molding shell, disposing the lens blank in a horizontal position and vertically above the molding shell, and heating the lens blank to cause thermal sagging under low static load conditions as the lens blank comes into contact with the coating composition on the molding surface and continuing heating until the lens blank mates with the molding surface.

2. Method according to claim 1, wherein the coating composition is at a temperature above its gel point when the lens blank first comes into contact therewith.

3. Method according to claim 1, wherein the coating includes a catalyst for progressive polymerization.

4. Method according to claim 1, wherein thermal sagging of the lens blank is effected such that the lens blank first comes into contact with the coating composition at a central area of the molding surface.

5. Method according to claim 1, wherein the static load exerted against the lens blank is less than 10 kg.

6. Method according to claim 1, wherein the static load exerted against the lens blank is between about 2.5 kg and about 50 g.

7. Method according to claim 6, wherein the lens blank has a diameter of about 80 mm and the static load exerted on the lens blank is about 100 g.

8. Method according to claim 1, wherein after the coating composition is applied to the molding surface, the molding shell is heated to a temperature above the gel point of the coating composition.

9. Method according to claim 1, wherein after the coating composition is applied to the molding surface, the molding shell is maintained at room temperature for sufficient time for the coating composition to become dust-dry.

10. Method according to claim 1', further comprising freely slidably mounting a complementary molding shell in a ring above the lens blank, the force of gravity on the complementary molding shell defining the static load exerted on the lens blank.

11. Method according to claim 1, further comprising freely slidably mounting a complementary molding shell in a ring above the lens blank, applying an additional weight to the complementary molding, the force of gravity on the complementary molding shell and additional weight defining the static load exerted on the lens blank.

12. Method according to claim 1, wherein the coating composition is a polysiloxane varnish.

* * * * *